United States Patent
Wilkes et al.

(10) Patent No.: US 9,079,612 B2
(45) Date of Patent: Jul. 14, 2015

(54) CLAMP ASSEMBLY FOR A STEERING COLUMN ASSEMBLY

(75) Inventors: Mark Anthony Wilkes, Birmingham (GB); Niclas Davies, Birmingham (GB)

(73) Assignee: TRW Limited, West Midlands (GB)

( * ) Notice: Subject to any disclaimer, the term of this patent is extended or adjusted under 35 U.S.C. 154(b) by 50 days.

(21) Appl. No.: 14/126,973

(22) PCT Filed: Jun. 13, 2012

(86) PCT No.: PCT/GB2012/051340
§ 371 (c)(1),
(2), (4) Date: Mar. 11, 2014

(87) PCT Pub. No.: WO2012/172334
PCT Pub. Date: Dec. 20, 2012

(65) Prior Publication Data
US 2014/0305251 A1    Oct. 16, 2014

(30) Foreign Application Priority Data

Jun. 17, 2011 (GB) .................................. 1110277.9

(51) Int. Cl.
*B62D 1/184* (2006.01)
*B62D 1/187* (2006.01)
*B62D 1/18* (2006.01)

(52) U.S. Cl.
CPC B62D 1/187 (2013.01); B62D 1/18 (2013.01); B62D 1/184 (2013.01)

(58) Field of Classification Search
CPC ........ B62D 1/18; B62D 1/184; F16B 7/1454; F16B 7/1472; F16B 7/149
See application file for complete search history.

(56) References Cited

U.S. PATENT DOCUMENTS

| 4,240,305 A | * | 12/1980 | Denaldi et al. | .................. | 74/493 |
| 5,361,646 A | * | 11/1994 | Venable | ........................... | 74/531 |

(Continued)

FOREIGN PATENT DOCUMENTS

| EP | 0832808 A1 | 4/1998 |
| EP | 1529713 A2 | 5/2005 |

(Continued)

OTHER PUBLICATIONS

Intellectual Search Report for GB1110277.9 dated Oct. 10, 2011.
(Continued)

*Primary Examiner* — Drew Brown
*Assistant Examiner* — Barry Gooden, Jr.
(74) *Attorney, Agent, or Firm* — MacMillan, Sobanski & Todd, LLC

(57) ABSTRACT

An adjustable steering column assembly includes a releasable clamp assembly that clamps a shroud of the assembly in position relative to a support bracket, the clamp assembly including an elongate clamp bolt onto which are stacked:
at least a part of an adjustable shroud of the steering assembly, and
a cam mechanism comprising a fixed cam part and a moving cam part, the two parts each having a bore through which the clamp bolt passes,
a thrust bearing,
and a locking nut which includes an internal thread that engages a complimentary thread on the clamp bolt and which is locked down so as to apply an axial load to the thrust bearing. The assembly also includes a tapered compliant bush which is pressed into a space defined between the clamp bolt and the bore of the moving cam part of the cam mechanism with the relatively thick end of the bush nearest the thrust bearing and with the thrust bearing applying an axial load to the bush.

11 Claims, 4 Drawing Sheets

(56) References Cited

U.S. PATENT DOCUMENTS

| | | | |
|---|---|---|---|
| 5,570,610 A * | 11/1996 | Cymbal | 74/493 |
| 5,921,577 A | 7/1999 | Weiss et al. | |
| 7,354,069 B2 | 4/2008 | Yamada | |
| 2003/0122358 A1* | 7/2003 | Bannon et al. | 280/775 |
| 2003/0172765 A1* | 9/2003 | Heiml | 74/493 |
| 2003/0221505 A1 | 12/2003 | Schick et al. | |
| 2004/0200306 A1* | 10/2004 | Schafer | 74/493 |
| 2005/0047701 A1 | 3/2005 | Schick et al. | |
| 2005/0093283 A1* | 5/2005 | Yamada | 280/775 |
| 2005/0178231 A1 | 8/2005 | Schick et al. | |
| 2006/0170204 A1* | 8/2006 | Higashino et al. | 280/775 |
| 2007/0068311 A1 | 3/2007 | Shimoda et al. | |
| 2007/0170711 A1* | 7/2007 | Bechtel et al. | 280/775 |
| 2009/0084218 A1 | 4/2009 | Bodtker | |
| 2012/0266715 A1* | 10/2012 | Okada et al. | 74/493 |
| 2013/0133462 A1* | 5/2013 | Yamamoto | 74/493 |
| 2013/0174685 A1* | 7/2013 | Yamamoto | 74/493 |
| 2013/0199866 A1* | 8/2013 | Yamamoto et al. | 180/443 |
| 2013/0213174 A1* | 8/2013 | Suzuki et al. | 74/493 |
| 2014/0109714 A1* | 4/2014 | Bodtker | 74/493 |
| 2014/0294496 A1* | 10/2014 | Gardiner | 403/374.2 |
| 2014/0318304 A1* | 10/2014 | Hahn et al. | 74/493 |
| 2014/0352482 A1* | 12/2014 | Ku | 74/495 |

FOREIGN PATENT DOCUMENTS

| | | |
|---|---|---|
| JP | 200769800 | 3/2007 |
| WO | 2004089722 A1 | 10/2004 |

OTHER PUBLICATIONS

International Search Report for PCT/GB2012/051340 dated Sep. 29, 2012.

* cited by examiner

CLAMP ASSEMBLY FOR A STEERING COLUMN ASSEMBLY

CROSS-REFERENCE TO RELATED APPLICATIONS

This application is a national stage of International Application No. PCT/GB2012/051340 filed Jun. 13, 2012, the disclosures of which are incorporated herein by reference in entirety, and which claimed priority to Great Britain Patent Application No. GB 1110277.9 filed Jun. 17, 2011, the disclosures of which are incorporated herein by reference in entirety.

BACKGROUND OF THE INVENTION

This invention relates to improvements collapsible steering column assemblies for vehicles to permit collapse during a crash.

Steering column assemblies for automotive vehicles and the like are increasingly required to be adjustable for steering wheel height known as rake and, in many cases, steering wheel distance known as reach. This requires the column shroud, within which the steering column shaft attached to the steering wheel is rotatably located, to be fixed to the vehicle by a clamp mechanism which can be locked and unlocked to either prevent or permit adjustment of the column shroud position respectively.

A typical adjustable steering column assembly comprises a first shroud portion, a second shroud portion and a clamp mechanism that includes a bracket secured to a fixed part of a vehicle and in which the first and second portions are releasably engaged by the clamp mechanism to selectively permit an amount of relative movement between the first and second portions that is required during adjustment of the steering column assembly. The clamp mechanism can be unlocked and locked by movement of a locking lever or handle or, sometimes, electrically using a motor or perhaps hydraulically or pneumatically.

By releasing the clamp mechanism and telescopically sliding the first portion over the second portion the length of the shroud can be altered, altering the reach position of an associated steering wheel. By moving both portions together up and down relative to the clamp mechanism the rake can be adjusted. In some assemblies only one of reach and rake may be adjusted. The clamp mechanism may clamp the shroud to a bracket (known as a support bracket) which is connected to the vehicle. Thus, when the clamp mechanism is locked the length of the steering column assembly is fixed, and it is prevented from moving due to the rigid connection through the bracket to the vehicle.

In a known arrangement the clamp mechanism comprises a relatively long clamp bolt having a head or nut at each end, a cam mechanism that is threaded onto the clamp bolt, and a locking lever or handle that operates the cam mechanism to vary the length of the cam mechanism. A part of the support bracket and/or shroud is also threaded onto the bolt, and as the cam mechanism increases in length the support bracket and shroud are squeezed together to clamp them in place. The lever must rotate relatively freely around the clamp bolt and yet should not rock excessively which give an unsatisfactory feel to the operator. In the past, this has been achieved using tight tolerances between the parts, but this has not always been satisfactory.

BRIEF SUMMARY OF THE INVENTION

According to a first aspect the invention provides an adjustable steering column assembly that includes a releasable clamp assembly that clamps a shroud of the assembly in position relative to a support bracket, the clamp assembly including an elongate clamp bolt onto which are stacked:

at least a part of an adjustable shroud of the steering assembly,
a cam mechanism comprising a fixed cam part and a moving cam part, the two parts each having a bore through which the clamp bolt passes,
a thrust bearing,
and a locking nut which includes an internal thread that engages a complimentary thread on the clamp bolt and which is locked down so as to apply an axial load to the thrust bearing, characterised by further comprising:

a tapered compliant bush which is pressed into a space defined between the clamp bolt and the bore of the moving cam part of the cam mechanism with the relatively thick end of the bush nearest the thrust bearing and with the thrust bearing applying an axial load to the bush.

The parts of the shroud cam mechanism, thrust bearing and locking nut may be stacked on the clamp bolt in the order as listed above.

The clamp bolt may also pass through an opening in the support bracket which is fixed relative to the vehicle body. This may be located in the stack between the cam mechanism and the shroud part.

A locking lever or handle may be provided which is fixed relative to the moving cam part. It may form an integral part of the moving cam part, enabling a driver to rotate the moving cam part which causes the length of the cam mechanism measured along the axis of the clamp bolt, to vary, changing the axial load applied to the tapered bush.

The provision of a tapered bush that is located in a space between the cam and the bolt and which receives an axial load from the thrust bearing assists in removing any tolerance which would otherwise allow the locking lever to rock giving a low quality feel.

The tapered bush may include one or more deformable projections which project from an end face of the bush which is closest the lever.

By deformable we mean projections that can be crushed, bent, compressed or otherwise deformed when a load is applied to them by the thrust bearing.

The projections may be resilient projections, perhaps of rubber material.

The projections may comprise castellations spaced around the end face of the bush.

A partially annular slot may be provided around the bush towards the widest end to form a partial ring of material between the slot and the end of the bush, and optionally one or more resilient projections—for example castellations—may be provided on this ring. The ring may therefore deflect as a load is applied to the castellations, allowing them to be compressed to close up the slot.

The thrust bearing may also apply an axial load to the end of the cam mechanism. Thus, the axial load applied to the thrust bearing by the nut is spread across the cam mechanism and the tapered bush.

The annular space into which the bush is wedged may also be tapered with a thick end of the taper closer the thrust beating, the rate of taper complimenting the rate of taper of the bush, the inner diameter of the space at its narrowest point being less than the external diameter of the bush at its narrowest point. It may be shaped such that with the bush completely in the space the bush is compressed radially at some, or all points, along its length.

The bush may be of a compliant material, such as rubber. It may be compressible radially to enable the outside diameter of the bush to be reduced. It may include a slot along at least a part of (and preferably all of) its length, such that it is forms a C-shape in cross section where the ends of the C-shape almost meet when in an uncompressed state, and can move towards each other to close the slot as it is compressed radially.

Making the bush complaint ensures that it can prevent rocking yet still permit the lever and moving cam part to rotate relatively freely around the clamp bolt. If it was too tight a fit it may impede the rotation of the lever, increasing the effort need to release and clamp the assembly to an unacceptably high level.

The length of the bush may be substantially the same as that of the axial length of moving cam part, or of the bore within the moving cam part, or may be slightly longer than the length of the cam part or the bore and able to be compressed such that its length is substantially the same or less than that of the moving cam part or the bore in the moving cam part.

The steering column assembly preferably includes a first shroud portion comprising an outer tube, a second shroud portion which comprises an inner tube, and the clamp assembly may clamp the outer tube to the support bracket Other advantages of this invention will become apparent to those skilled in the art from the following detailed description of the preferred embodiments, when read in light of the accompanying drawings.

DETAILED DESCRIPTION OF THE INVENTION

Figure 1:
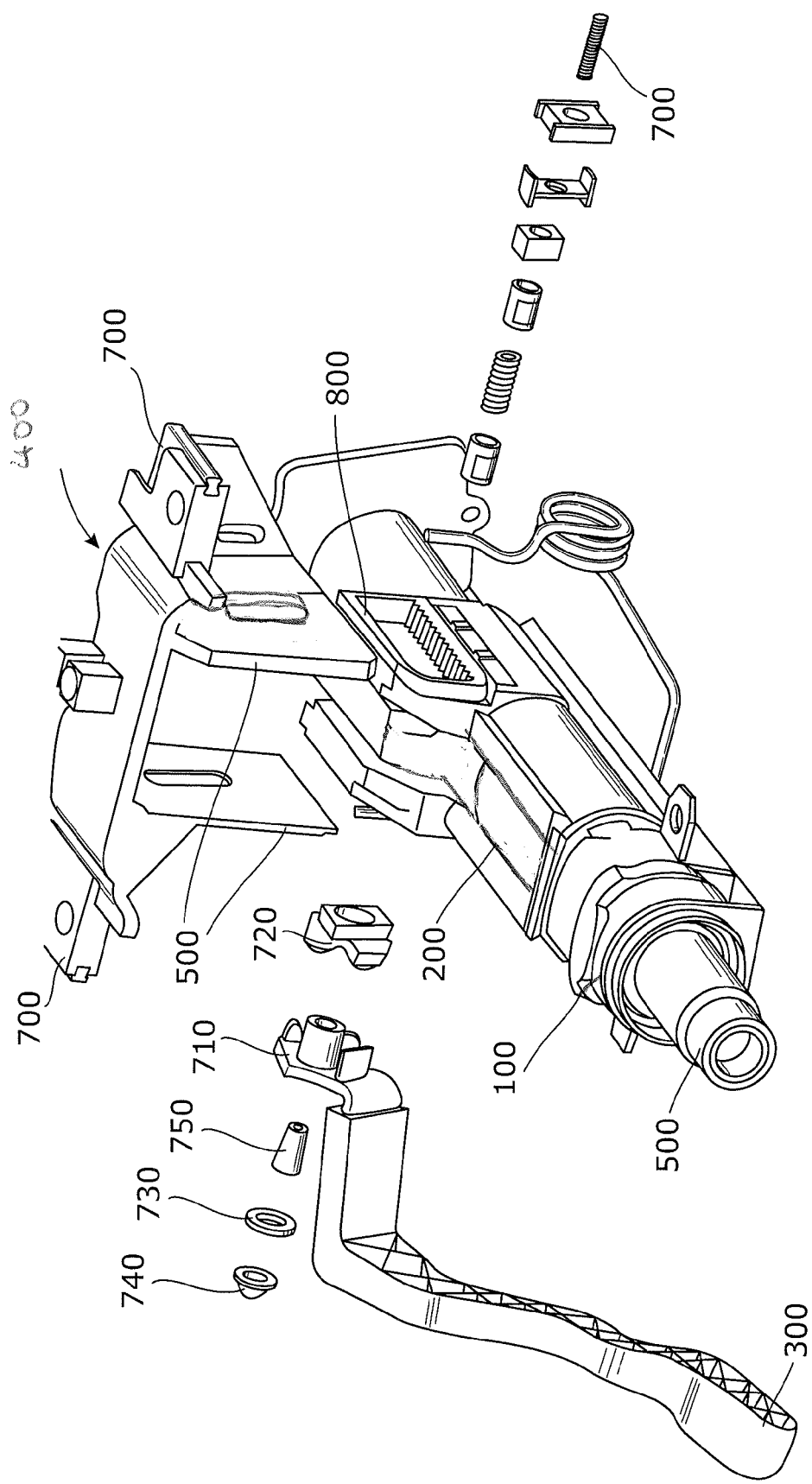
FIG. 1 is an exploded view of a embodiment of a steering column assembly according to the present invention.
Figure 2:
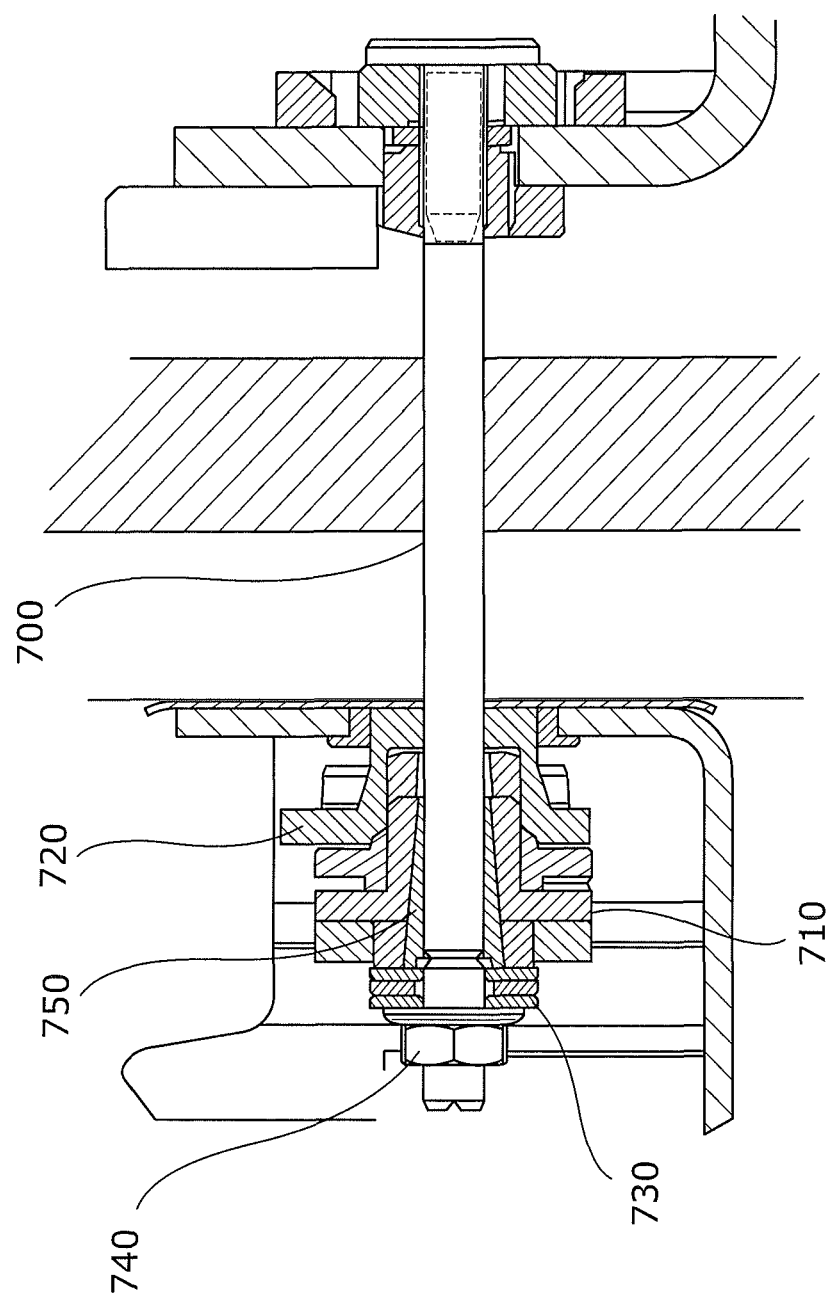
FIG. 2 is a cross section through a portion of the assembly of FIG. 1 along the central axis of the clamp bolt.
Figure 3:
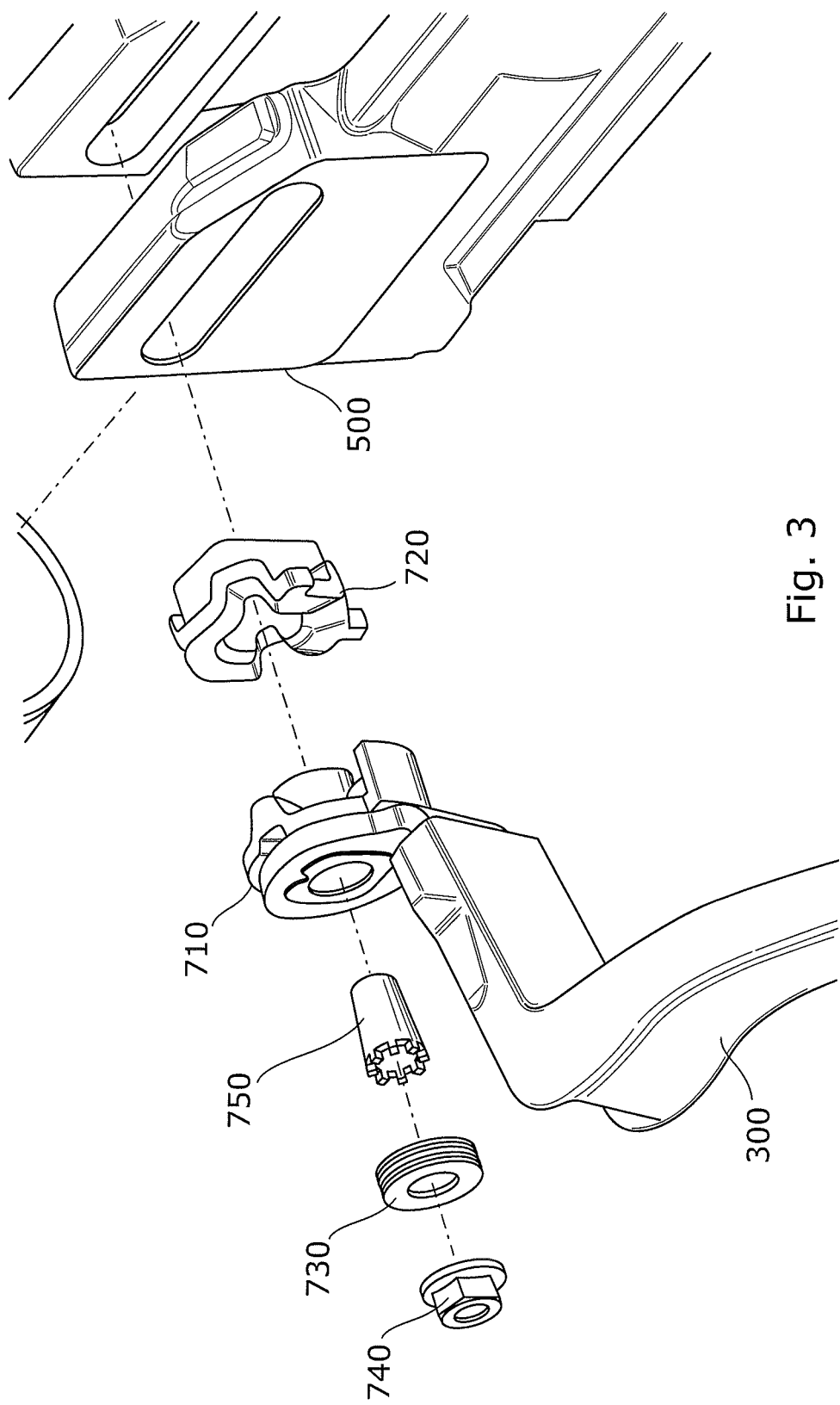
FIG. 3 is an exploded perspective view of the component parts of the clamp assembly in the region of the locking handle.

FIGS. 1 to 5 of the accompanying drawings show a so-called double-adjustment type steering column assembly. Such columns can be adjusted for both reach (in and out) and rake angle (up and down). The invention could, equally, apply to single adjust columns and non-adjust columns. The column assembly comprises a first shroud portion 100 and a second shroud portion 200 which can telescope relative to one another to allow for reach adjustment and which can both be moved in an arc around a pivot point axis to allow for rake adjustment. The telescoping mechanism allows the adjustment of the Reach position by the driver and also allows the first shroud portion to move forward in a controlled manner in the event of the steering wheel (not shown) being impacted by the driver in a crash.

The first shroud portion 100, being closest to the steering wheel, comprises an outer tube which supports the steering wheel shaft 500 via a ball bearing. The second shroud portion 200, closer to the power assistance motor, comprises an inner tube over which the outer tube is free to slide telescopically. There may be a special bushing (not shown) between the connecting diameters of these Shrouds to minimise the sliding friction.

The inner and outer tubes 100, 200 are fixed in position by a releasable clamp assembly which is operated by a locking lever 300 that can be gripped by a driver. In a disengaged (unlocked, unclamped) position the outer tube 100 is free to move telescopically through the reach adjustment stroke along the inner tube 200. When in the fully engaged (locked, clamped) position, the clamp assembly secures the outer tube 100 to a support bracket 400 by a positive locking of inter-engaged teeth so the inner and outer tubes 100, 200 can no longer move telescopically. It is this telescopic sliding action that enables the axial, or "Reach", position of the steering wheel to be varied.

The lower end of the inner tube 200 is pivoted from the vehicle about a transverse axis (called the Rake Pivot axis). Rotation, in a vertical plane, of the assembly comprising both shrouds results in a variation of the steering wheel height or "Rake" setting. Alternatively, it may be fixed to an electric power steering gearbox which itself is pivoted to the vehicle structure at the Rake Pivot Axis.

The support bracket 400 is secured to the vehicle. The bracket comprises an inverted U-shaped bracket which has two arms 500 which extend downwards on either side of the shroud in the region where the inner and outer tubes 100, 200 overlap. This bracket 400 helps to prevent the steering column from moving side to side under load. In the locked position, the clamp assembly locks the inner and outer tubes 100, 200 in position between the arms of this bracket to prevent rake being altered.

The bracket 400 is fixed to a mounting bracket (not shown), which in turn is secured in two places to a part of the vehicle body. In the event of a crash, additional fusible connections 700, acting between the bracket 400 and the vehicle body, are severed by the impact force of the driver striking the steering wheel. The bracket 400 then slides forwards relative to the vehicle body. During this sliding process, the steering wheel is maintained in a substantially linear path by the combination of the telescoping of shrouds 100 and 200.

The clamping assembly is designed so that the one lever 300 simultaneously releases or locks the first portion (the upper shroud) to the second and third portions (lower shroud portion and rake bracket) in respect of both the Rake and the Reach directions. The clamping system comprises a clamp bolt 700, which passes through a slot in each arm 500 of the bracket (which as mentioned previously is attached via the mounting bracket to the vehicle structure) and a slot in each side of a fixed rack portion 800, in this example a rail which is attached to the top face of the outer tube 100. An adjusting nut is provided at one end of the bolt and a cap at the other.

A cam mechanism 710, 720 is located on the clamp bolt 700 between the nut and the outer face of one of the arms of the rake bracket 12. The cam mechanism comprises a pair of face-cams, one of which is prevented from rotating while the other is attached to the clamp lever 300. The length of the cam mechanism (along the axis of the bolt) can be adjusted by rotation of the lever 300. The moving cam part 710 of the cam mechanism abuts a thrust bearing 730 which in turn abuts the adjusting nut 740 which is screwed onto the threaded end of the clamp bolt 700. As the cam assembly lengthens when the lever is rotated to a locked position, it applies tension to the clamp bolt, drawing the cap towards the nut and so squeezing the arms of the rake bracket onto the sides of the reach bracket.

The outer tube 100 includes an elongate slot in a position which passes between the arms of the bracket 400 so that as the arms are squeezed together the slot tends to at least partially close. This clamps the outer tube 100 onto the inner tube 200 and helps prevent relative movement of the inner and outer tubes, fixing the length of the steering assembly. Some form of positive locking may also be provided as required, such as rows of locking teeth as is known in the art.

The clamp bolt has to be relatively long to pass through the cam mechanism and the two arms of the support bracket 400. As such, the tolerances present along its length build up to a high level. The adjustment of the nut 740 allows these to be largely accommodated. To further help with accommodating these tolerances, a tapered compliant bush 750 is provided. This is an annular bush with a central hole that the clamp bolt 700 can pass through. The bush is wedged into a position within a corresponding tapered annular void defined between the moving cam portion 710 and the clamp bolt 700. This bush helps prevent the lever 300 from waggling side to side as it is turned by a driver. The bush is pressed down, narrow end first, into the gap, to remove any free play. This can be seen best in FIGS. 2 and 3 of the drawings.

The bush 750 is compliant and is made of resilient material, and is also provided with a set of upstanding pegs or castellations 751 on the widest end which can be crushed by the load applied to them by the thrust bearing 730. This ensures that the thrust bearing applies most of its load to the end face of the cam portion 710 rather than the tapered bush when the clamp assembly is tightened up.

Figure 4:
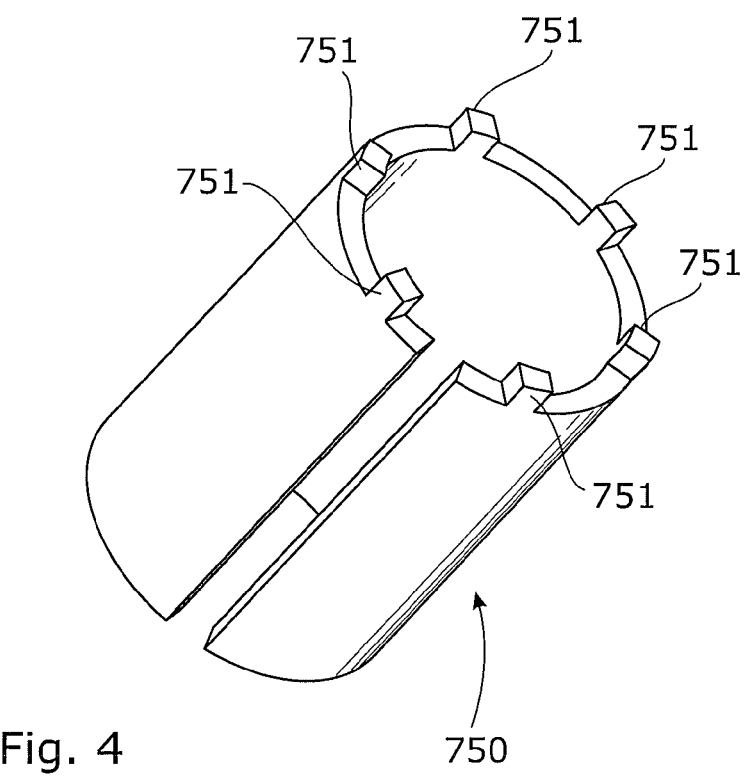
FIG. 4 is a perspective view of a tapered bush of the clamp assembly.
Figure 5:
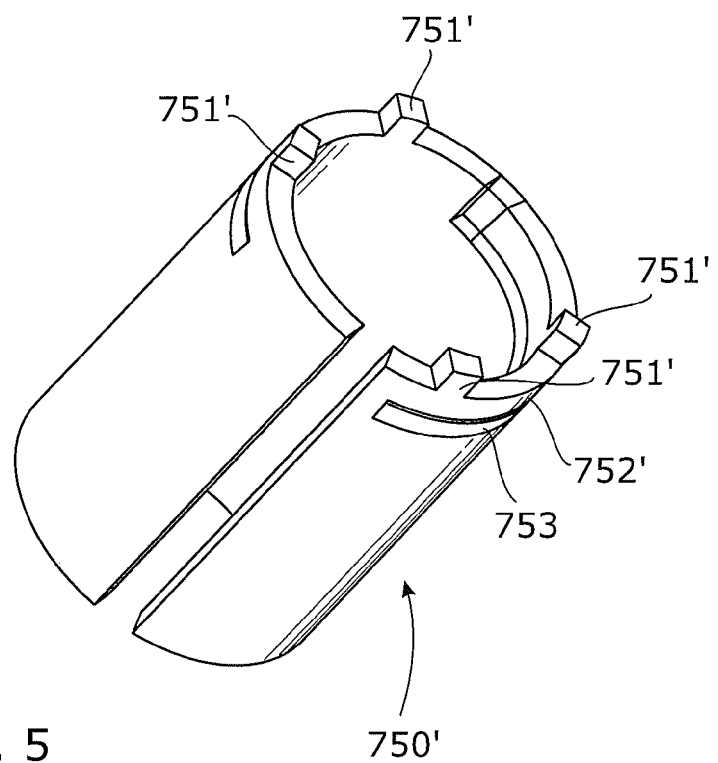
FIG. 5 is a perspective view of an alternative shape of tapered bush of the clamp assembly.

FIGS. 4 and 5 show two different shapes of bush 750 and 750'. Each one is intended to provide defined compression when forced into the tapered gap. In FIG. 4, small castellations 751 extend from the wide end of the bush which can be crushed or bent as a load is applied from the thrust bearing.

In FIG. 5 two annular slots 753' are formed around almost an entire circumference of the bush 750' a small distance inboard from the wide end of the bush. This allows sections of the ring of material so formed at the wide end to be compressed downwards as thrust bearing 730 acts against the castellations 751'. The castellations themselves may therefore be relatively rigid, the compression coming from deformation of the ring 752' rather than crushing or bending of the castellations.

Once in position the bush limits the rocking motion of the lever whilst still permitting it to rotate relatively freely around the clamp bolt when moving towards the unclamped position. Because it is compliant, it will automatically accommodate variations in dimensions of parts due to tolerances, so that a consistent feel for the lever is achieved each time.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed:

1. An adjustable steering column assembly that includes a releasable clamp assembly that clamps a shroud of the adjustable steering column assembly in position relative to a support bracket, the releasable clamp assembly including an elongate clamp bolt onto which are stacked:
   at least a part of an adjustable shroud of the adjustable steering assembly,
   a cam mechanism comprising a fixed cam part and a moving cam part, the two parts each having a bore through which the clamp bolt passes,
   a thrust bearing,
   and a locking nut which includes an internal thread that engages a complimentary thread on the clamp bolt and which is locked down so as to apply an axial load to the thrust bearing,
   further comprising:
   a tapered compliant bush which is pressed into a space defined between the clamp bolt and the bore of the moving cam part of the cam mechanism with a relatively thick end of the bush nearest the thrust bearing and with the thrust bearing applying an axial load to the bush.

2. The adjustable steering column assembly according to claim 1 in which the clamp bolt passes through an opening in the support bracket which is fixed relative to a vehicle body.

3. The adjustable steering column assembly according to claim 1 in which the thrust bearing applies an axial load to an end of the cam mechanism.

4. The adjustable steering column assembly according to claim 1 in which a locking lever or handle is provided which is fixed relative to the moving cam part.

5. The adjustable steering column assembly according to claim 4 in which the tapered bush includes one or more deformable projections which project from an end face of the bush which is closest to the lever which, during assembly of the adjustable steering column assembly can be crushed, bent, compressed or otherwise deformed when a load is applied to the one or more deformable projections by the thrust bearing.

6. The adjustable steering column assembly according to claim 1 in which the bush is of a compliant material.

7. The adjustable steering column assembly of claim 6 in which the bush is of rubber.

8. The adjustable steering column assembly according to claim 1 in which the bush includes a slot along a length thereof, such that the bush forms a C-shape in cross section where ends of the C-shape almost meet when in an uncompressed state, and can move towards each other to close the slot as the bush is compressed radially.

9. The adjustable steering column assembly according to claim 8 in which a partially annular slot is provided around the bush towards a widest end thereof to form a partial ring of material between the slot and the end of the bush.

10. The adjustable steering column assembly according to claim 1 in which the space into which the bush is pressed is tapered with a thick end of the taper closer to the thrust beating, a rate of the taper complimenting a rate of the taper of the bush, an inner diameter of the space at a narrowest point thereof being less than an external diameter of the bush at a narrowest point.

11. The adjustable steering column assembly according to claim 10 in which the space is shaped such that with the bush completely in the space the bush is compressed radially at some, or all points, along a length thereof.

* * * * *